US012522110B2

(12) United States Patent
Park et al.

(10) Patent No.: US 12,522,110 B2
(45) Date of Patent: Jan. 13, 2026

(54) APPARATUS AND METHOD OF CONTROLLING THE SAME COMPRISING A CAMERA AND RADAR DETECTION OF A VEHICLE INTERIOR TO REDUCE A MISSED OR FALSE DETECTION REGARDING REAR SEAT OCCUPATION

(71) Applicant: HL Klemove Corp., Incheon (KR)

(72) Inventors: Jang-Woong Park, Incheon (KR); Jeong Kim, Incheon (KR)

(73) Assignee: HL Klemove Corp., Incheon (KR)

( * ) Notice: Subject to any disclaimer, the term of this patent is extended or adjusted under 35 U.S.C. 154(b) by 384 days.

(21) Appl. No.: 18/217,785

(22) Filed: Jul. 3, 2023

(65) Prior Publication Data

US 2024/0181936 A1  Jun. 6, 2024

(30) Foreign Application Priority Data

Dec. 2, 2022  (KR) ........................ 10-2022-0166945

(51) Int. Cl.
*B60N 2/00* (2006.01)
*B60R 22/48* (2006.01)
*G06V 20/59* (2022.01)

(52) U.S. Cl.
CPC ......... *B60N 2/0027* (2023.08); *B60N 2/0022* (2023.08); *B60N 2/0029* (2023.08);
(Continued)

(58) Field of Classification Search
CPC ...... B60Q 9/00; B60N 2/0027; B60N 2/0029; B60N 2210/20; B60N 2210/24;
(Continued)

(56) References Cited

U.S. PATENT DOCUMENTS 8,604,932 B2 * 12/2013 Breed ................. B60R 11/0241
340/576
10,672,247 B2 * 6/2020 Yang ...................... A61B 5/002
(Continued)

FOREIGN PATENT DOCUMENTS

JP         2006-159939 A    6/2006
KR         10-2228879 B1    3/2021
KR     10-2021-0070743 A    6/2021

*Primary Examiner* — Chad Dickerson
(74) *Attorney, Agent, or Firm* — Hauptman Ham, LLP

(57) ABSTRACT

Disclosed herein is an apparatus for rear seat detection. The apparatus may include: an indoor camera having a field of view for a vehicle interior and configured to provide image data; an indoor radar having a sensing area for the vehicle interior and configured to provide radar data; a controller including a first processor and a second processor. The first processor configured to obtain information on a change in a front passenger seat and a rear seat of a vehicle based on processing the image data The second processor configured to obtain motion information on an object in the rear seat of the vehicle based on processing the radar data. The first controller may identify a change of a detection area in the rear seat based on the information on the change in the front passenger seat and the rear seat of the vehicle, and determine whether a human is seated in the rear seat of the vehicle based on the motion information on the object in the detection area where the change is identified.

20 Claims, 12 Drawing Sheets

(52) U.S. Cl.
CPC .......... B60R 22/48 (2013.01); *B60N 2210/20* (2023.08); *B60N 2210/24* (2023.08); *B60R 2022/4808* (2013.01)

(58) Field of Classification Search
CPC . B60R 2022/4808; B60R 22/48; G01S 13/42; G01S 13/58; G01S 13/931; G01S 7/415; G06T 2207/10028; G06T 2207/10044; G06T 2207/30196; G06T 2207/30268; G06T 7/246; G06V 20/593; G06V 40/10
USPC ........................................ 382/104, 106, 107
See application file for complete search history.

(56) References Cited

U.S. PATENT DOCUMENTS

| | | | |
|---|---|---|---|
| 2019/0256028 A1* | 8/2019 | Hosokawa | G06V 20/593 |
| 2020/0298796 A1* | 9/2020 | Cech | G06T 7/557 |
| 2023/0166737 A1* | 6/2023 | Susumago | G06V 20/593 |
| | | | 701/1 |
| 2023/0339369 A1* | 10/2023 | Diamond | B60N 2/002 |
| 2024/0144801 A1* | 5/2024 | Jeon | E05F 15/73 |
| 2024/0185619 A1* | 6/2024 | Park | G01S 13/931 |

* cited by examiner

APPARATUS AND METHOD OF CONTROLLING THE SAME COMPRISING A CAMERA AND RADAR DETECTION OF A VEHICLE INTERIOR TO REDUCE A MISSED OR FALSE DETECTION REGARDING REAR SEAT OCCUPATION

CROSS-REFERENCE TO RELATED APPLICATION

This application claims the benefit of Korean Patent Application No. 10-2022-0166945, filed on Dec. 2, 2022 in the Korean Intellectual Property Office, the disclosure of which is incorporated herein by reference.

BACKGROUND

Technical Field

Embodiments of the present disclosure relate to an apparatus for notifying whether a rear seat occupant is seated and a controlling method thereof.

Background

In most vehicles, a conventional seat belt alert is a safety function that determines whether a seat is occupied using a pressure sensor mounted only on a driver's seat and a front passenger's seat, and notifies a dangerous situation with a cluster warning sound when not wearing a seat belt.

However, in relation to notification of whether a rear seat is occupied, tilting the front passenger seat or sliding the rear seat may change a location of the seat and thus cause false detection regarding the sitting of a rear seat occupant.

SUMMARY

Therefore, it is an aspect of the present disclosure to provide an apparatus capable of notifying whether a rear seat occupant is seated more accurately through an indoor camera and an indoor radar, and a controlling method thereof.

Additional aspects of the disclosure will be set forth in part in the description which follows and, in part, will be obvious from the description, or may be learned by practice of the disclosure.

In accordance with one aspect of the present disclosure, an apparatus may include: an indoor camera having a field of view for a vehicle interior and configured to provide image data; an indoor radar having a sensing area for the vehicle interior and configured to provide radar data; a controller including a first processor and a second processor, the first processor configured to obtain information on a change in a front passenger seat and a rear seat of a vehicle based on processing the image data, and the second processor configured to obtain motion information on an object in the rear seat of the vehicle based on processing the radar data. The first controller may identify a change of a detection area in the rear seat based on the information on the change in the front passenger seat and the rear seat of the vehicle, and determine whether a human is seated in the rear seat of the vehicle based on the motion information on the object in the detection area where the change is identified.

The controller may obtain motion information including a distance, a velocity, and an angle of arrival of the object by performing digital signal processing on the radar data.

The controller may obtain a respiratory rate, a heart rate, and point cloud information of the object based on the motion information.

The controller may determine whether the object is moving based on the obtained information.

The point cloud information may include x, y, and z coordinate information of points constituting the object.

The controller may obtain coordinate information of each vertex of a changed detection area based on identifying the change of the detection area in the rear seat.

The controller may identify the changed detection area based on the obtained coordinate information.

The controller may obtain a respiratory rate, a heart rate, and point cloud information of the object based on the motion information in the detection area where the change is identified.

The controller may determine that the human is seated in the rear seat of the vehicle, based on a point cloud being formed in the detection area where the change is identified.

The controller may transmit information indicating that the human is seated in the rear seat of the vehicle to a vehicle controller configured to detect whether a seat belt is worn.

In accordance with one aspect of the present disclosure, a method may include: obtaining image data by an indoor camera; obtaining radar data by an indoor radar; obtaining information on a change of a front passenger seat and a rear seat of a vehicle based on processing the image data by at least one processor; obtaining motion information on an object in the rear seat of the vehicle based on processing the radar data by the at least one processor; identifying a change of a detection area in the rear seat based on the information on the change in the front passenger seat and the rear seat of the vehicle by the at least one processor; and determining whether a human is seated in the rear seat of the vehicle based on the motion information on the object in the detection area where the change is identified by the at least one processor.

The obtaining of the motion information may include obtaining motion information including a distance, a velocity, and an angle of arrival of the object by performing digital signal processing on the radar data.

The obtaining of the motion information may include obtaining a respiratory rate, a heart rate, and point cloud information of the object based on the motion information.

The obtaining of the motion information may include determining whether the object is moving based on the obtained information.

The point cloud information may include x, y, and z coordinate information of points constituting the object.

The method may further include obtaining coordinate information of each vertex of a changed detection area based on identifying the change of the detection area in the rear seat.

The determining of whether the human is seated in the rear seat of the vehicle may include identifying the changed detection area based on the obtained coordinate information.

The determining of whether the human is seated in the rear seat of the vehicle may include obtaining a respiratory rate, a heart rate, and point cloud information of the object based on the motion information in the detection area where the change is identified.

The determining of whether the human is seated in the rear seat of the vehicle may include determining that the human is seated in the rear seat of the vehicle, based on a point cloud being formed in the detection area where the change is identified.

The method may further include transmitting information indicating that the human is seated in the rear seat of the vehicle to a vehicle controller configured to detect whether a seat belt is worn.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
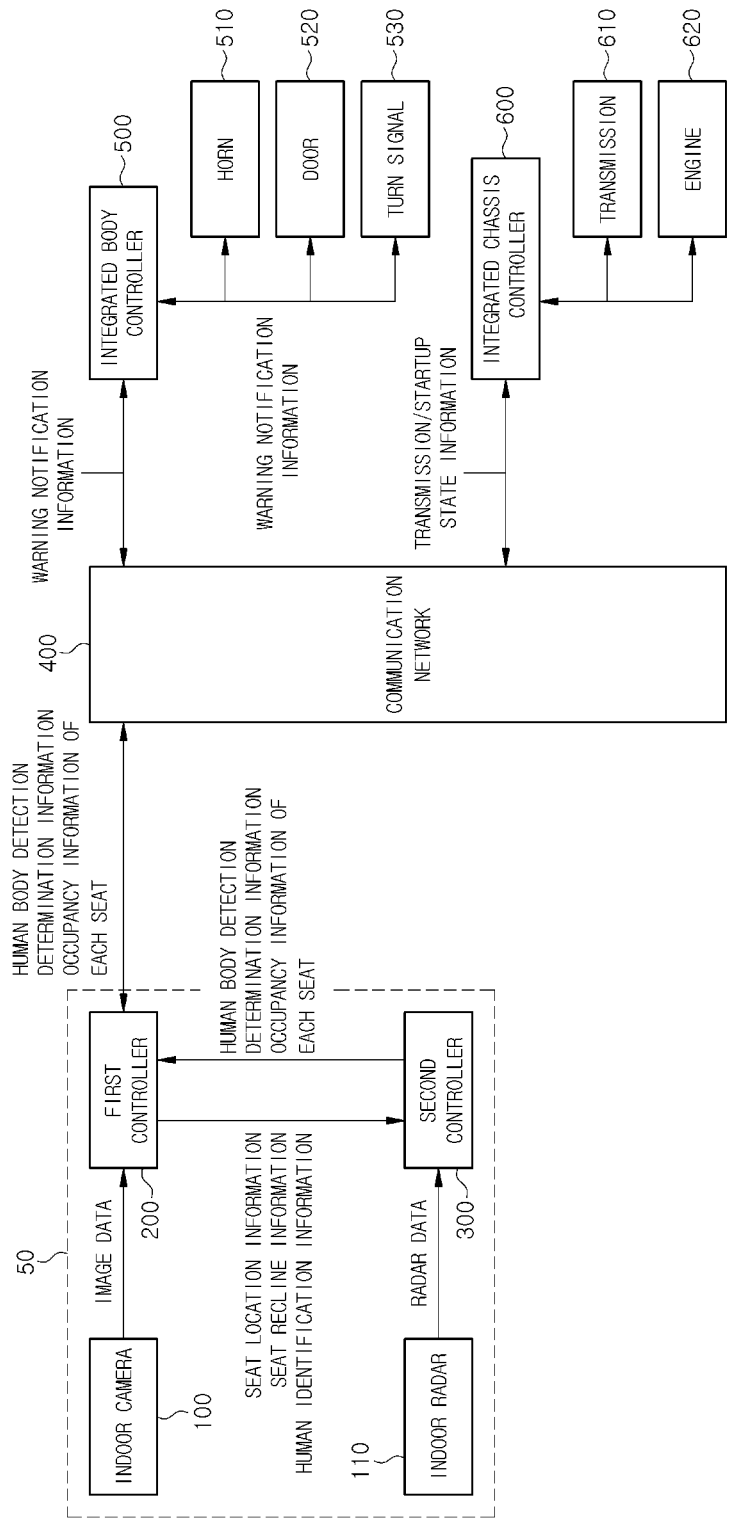
FIG. 1 illustrates a configuration of a rear seat detection device in accordance with one embodiment.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

The expression, "at least one of a, b, and c," should be understood as including only a, only b, only c, both a and b, both a and c, both b and c, or all of a, b, and c.

Reference will now be made in detail to the exemplary embodiments of the present disclosure, examples of which are illustrated in the accompanying drawings, wherein like reference numerals refer to like elements throughout.

Figure 2:
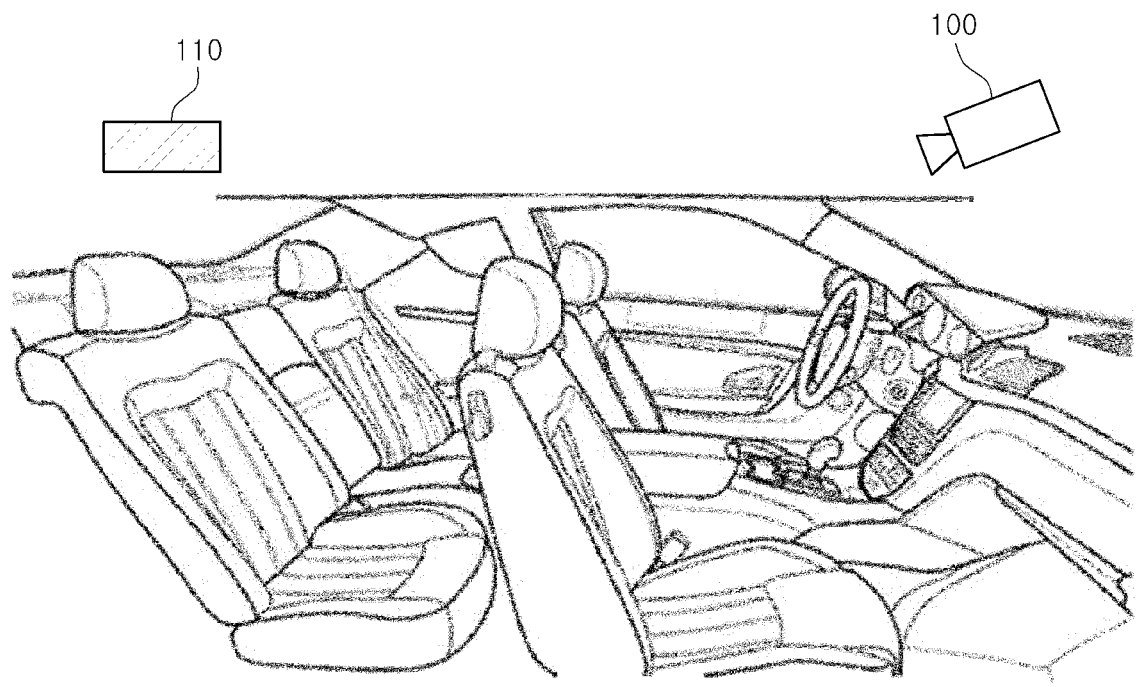
FIG. 2 illustrates locations inside a vehicle where an indoor camera and an indoor radar are installed in accordance with one embodiment.

FIG. 1 illustrates a configuration of a rear seat detection device in accordance with one embodiment. FIG. 2 illustrates locations inside a vehicle where an indoor camera and an indoor radar are installed in accordance with one embodiment.

As illustrated in FIG. 1, a vehicle may include a rear seat detection device 50, which includes an indoor camera 100, an indoor radar 110, a first controller 200, and a second controller 300, a vehicle communication network 400, an integrated body controller 500, a horn 510, a door 520, a turn signal 530, an integrated chassis controller 600, a transmission 610, and an engine 620. The horn 510, the door 520, and the turn signal 530 may output a warning under control of the integrated body controller 500 according to rear seat occupant alert information transmitted from the first controller 200. The transmission 610 and the engine 620 may transmit information regarding whether a vehicle's ignition is on and a transmission state of the transmission 610 to the first controller 200 through the integrated chassis controller 600.

The rear seat detection device 50, the integrated body controller 500, and the integrated chassis controller 600 may communicate with each other via the vehicle communication network 400. For example, the rear seat detection device 50, the integrated body controller 500, and the integrated chassis controller 600 may send and receive data via Ethernet, MOST (Media Oriented Systems Transport), Flexray, CAN (Controller Area Network), LIN (Local Interconnect Network), and the like. The vehicle communication network 400 may be any wired or wireless communication network appropriate for sending and receiving data.

The rear seat detection device 50 may include the indoor camera 100, the indoor radar 110, the first controller 200, and the second controller 300. The first controller 200 may be an indoor camera controller, and the second controller 300 may be an indoor radar controller.

The indoor camera 100, the indoor radar 110, the first controller 200, and the second controller 300 may be provided separately from each other. For example, the first controller 200 may be installed in a housing that is separate from a housing of the indoor camera 100. The second controller 300 may be installed in a housing that is separate from a housing of the indoor radar 110. The first controller 200 and the second controller 300 may send and receive data to and from the indoor camera 100 or the indoor radar 110 via a broadband network. The first controller 200 and the second controller 300 may send and receive data to and from the indoor camera 100 or the indoor radar 110 via a wired and/or wireless network.

In addition, at least a part of the indoor camera 100, the indoor radar 110, the first controller 200, and the second controller 300 may be integrated and provided. For example, the indoor camera 100 and the first controller 200 may be provided in one housing, or the indoor radar 110 and the second controller 300 may be provided in one housing. In some embodiments, the indoor camera 100 and the first controller 200 may be provided in one housing and the indoor radar 110 and the second controller 300 may be provided in another housing. In some embodiments, the indoor camera 100, the first controller 200, the indoor radar 110 and the second controller 300 may be provided in one housing.

The indoor camera 100 may capture an interior of the vehicle and obtain image data of a driver. For example, as illustrated in FIG. 2, the indoor camera 100 may be installed in a rear view mirror or installed inside a front windshield and may have a field of view directed to the interior of the vehicle.

The indoor camera 100 may include a plurality of lenses and an image sensor. The image sensor may include a plurality of photodiodes that convert light into an electric signal, and the plurality of photodiodes may be placed in a two-dimensional matrix. The Image data may include information on an object in a rear seat inside the vehicle.

The rear seat detection device 50 may include an image processor 52 for processing image data of the indoor camera 100, and the image processor 52 may be integrally provided with, for example, the indoor camera 100 or the first controller 200.

The image processor 52 may obtain image data from the image sensor of the indoor camera 100 and obtain identification information on the object in the rear seat based on processing the image data.

The indoor radar 110 may send a transmission radio wave into the vehicle and obtain radar data associated with a motion of the object inside the vehicle based on a reflected radio wave reflected from the object in the rear seat. For example, as illustrated in FIG. 2, the indoor radar 110 may be installed in a headliner of a second row of the vehicle, and may have a sensing area directed to the interior of the vehicle.

The indoor radar 110 may include a transmission antenna (or transmission antenna array) emitting a transmission radio wave into the vehicle and a reception antenna (or reception antenna array) receiving a reflected radio wave reflected from the object.

The indoor radar 110 may obtain radar data from the transmission radio wave transmitted by the transmission antenna and the reflected radio wave received by the reception antenna. The radar data may include location information (for example, distance information) and/or velocity information of the object in the rear seat inside the vehicle.

The rear seat detection device 50 may include a signal processor 54 for processing the radar data of the indoor radar 110, and the signal processor 54 may be integrally provided with, for example, the indoor radar 110 or the second controller 300.

The signal processor 54 may obtain radar data from the reception antenna of the indoor radar 110 and create data about a motion of the object by clustering reflection points of reflected signals. For example, the signal processor 54 may obtain a distance to the object based on a time difference between a transmission time of a transmission radio wave and a reception time of a reflected radio wave and obtain a velocity of the object based on a difference between a frequency of the transmission radio wave and a frequency of the reflected radio wave.

The signal processor 54 may deliver data about a motion of the object in the rear seat inside the vehicle obtained from the radar data to the second controller 300.

The first controller 200 may be electrically connected with the indoor camera 100, and the second controller 300 may be electrically connected with the indoor radar 110. In addition, the first controller 200 or the second controller 300 may be connected with the integrated body controller 500, the integrated chassis controller 600, and the like via a vehicle communication network.

The first controller 200 may process the image data of the indoor camera 100, and the second controller 300 may process the radar data of the indoor radar 110 and provide a control command to the integrated body controller 500.

Each of the first controller 200 and the second controller 300 may include a processor and a memory. The processor may have an associated non-transitory memory storing software instructions which, when executed by the processor, provides the functionalities of creating a control command for controlling the integrated body controller 500 and the integrated chassis controller 600 based on the processed data. The processor may take the form of one or more processor(s) and associated memory storing program instructions, and in some examples the one or more processor(s) may be used to implement the functions of both the first controller 200 and the second controller 300 and the processor associated with each.

The memory may store a program and/or data for processing image data and radar data. In addition, a control command for controlling the integrated body controller 500 may be stored.

The memory may temporarily memorize the image data received from the indoor camera 100 and the radar data received from the indoor radar 110 and temporarily memorize a processing result of the processor for the image data and the radar data.

The memory may include not only a volatile memory such as an S-RAM and a D-RAM but also a non-volatile memory such as a flash memory, a read only memory (ROM), and an erasable programmable read only memory (EPROM).

The processor may process the image data of the indoor camera 100 and the radar data of the indoor radar 110. For example, the processor may fuse the image data and the radar data and output fused data.

The processor may create a control command for controlling the integrated body controller 500 based on processing the fused data. For example, the processor may determine that there is an occupant in a rear seat by processing detection information on an object obtained from the indoor camera 100 and the indoor radar 110. In addition, the processor may create a control command to enable the integrated body controller 500 to control the horn 510, the door 520, and the turn signal 530 and output a warning accordingly.

The processor may include an image processor 52 for processing the image data of the indoor camera 100, a signal processor 54 for processing the radar data of the indoor radar 110, or a micro control unit (MCU) for creating a control command for a control target.

As described above, the first controller 200 and the second controller 300 may provide control commands suitable for each of various situations, where an occupant is in a rear seat, to the integrated body controller 500 or a controller configured to determine whether the occupant is wearing a seat belt based on the image data of the indoor camera 100 and the radar data of the indoor radar 110.

A concrete operation of the rear seat detection device 50 will be described in further detail below.

In the case of determining whether a rear seat is occupied, when detection is determined for each seat, an area of each rear seat has a fixed value set during the manufacture of the product, and cannot reflect area information that is changed according to a dynamic change of a seat location. Thus, when the location of the rear seat is changed forward or backward due to sliding of the rear seat and the rear seat leaves a predefined area, even if the seat is occupied, it may be determined that the seat is not occupied. In addition, when the area of the rear seat is invaded by sliding a front passenger's seat backward or by bending a back, even if the rear seat is not occupied, it may be determined that the seat is occupied. False detection or missed detection may cause discomfort to a driver.

The rear seat detection device 50 according to the disclosed embodiment may significantly reduce the possibility of false detection or missed detection by combining detection results of the indoor camera 100 and the indoor radar 110. A concrete operation will be described in further detail below.

Figure 3:
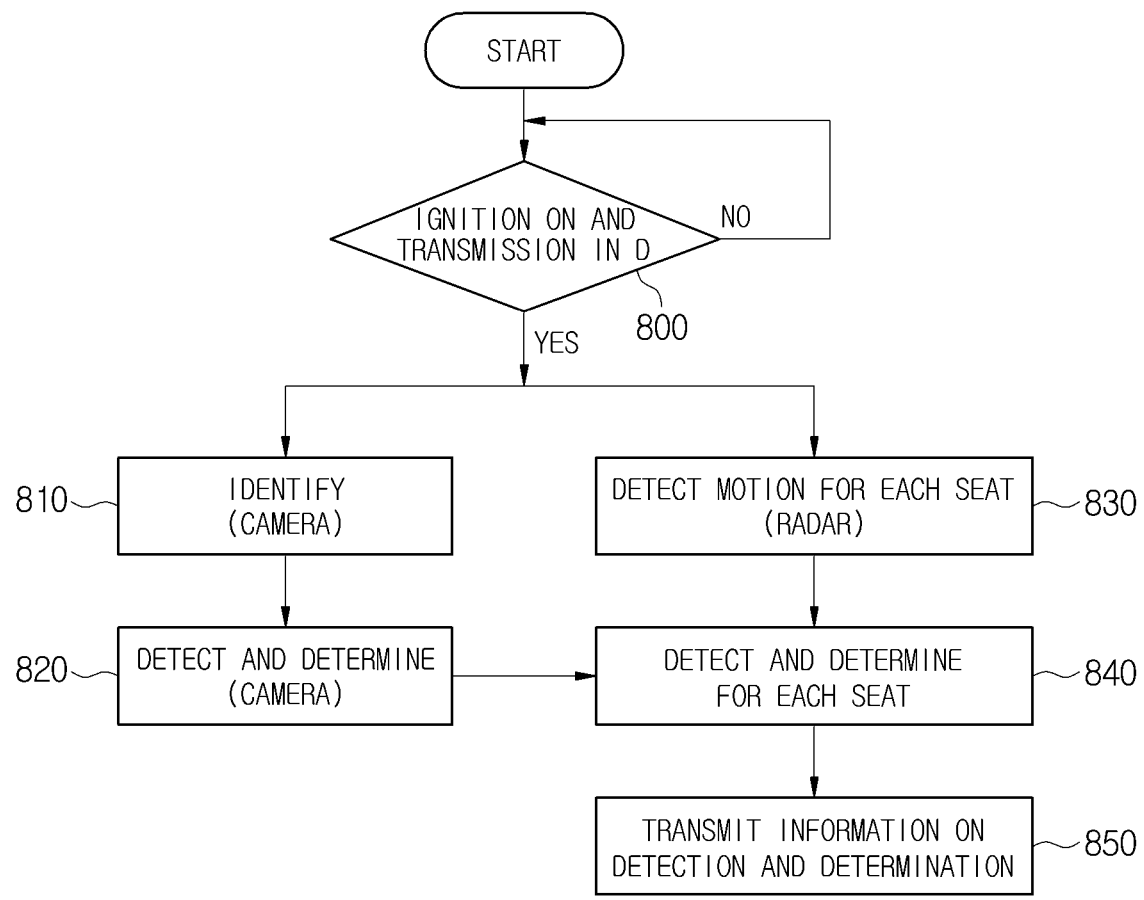
FIG. 3 illustrates a method of detecting a rear seat in accordance with one embodiment.
Figure 4:
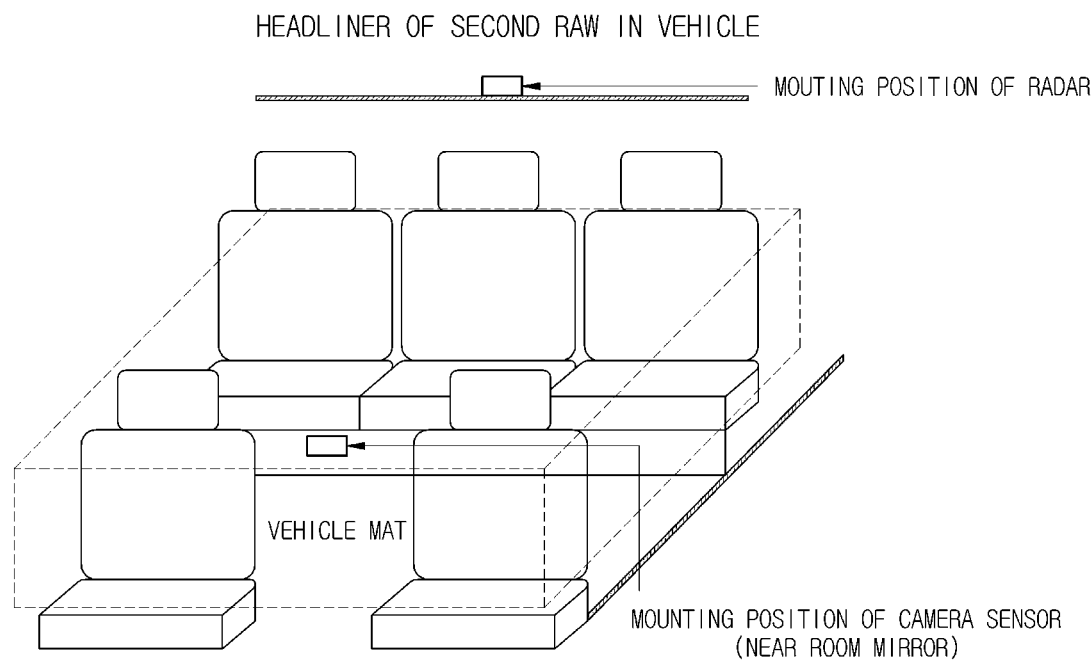
FIG. 4 illustrates a detection area of the indoor camera in accordance with one embodiment.
Figure 5:
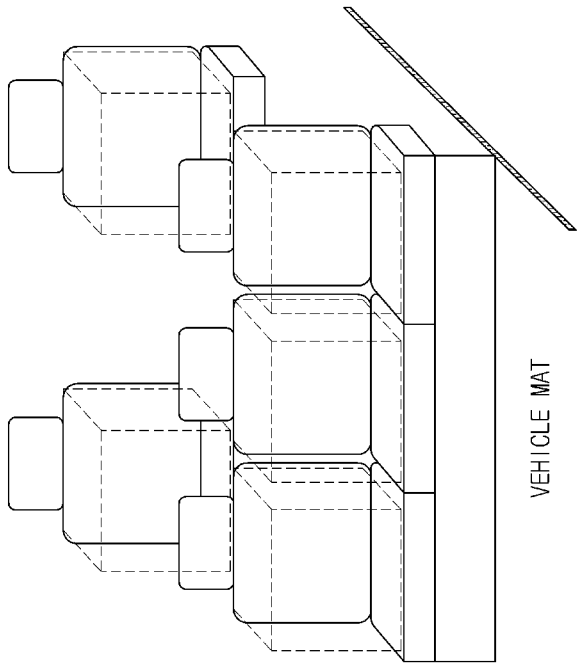
FIG. 5 illustrates a detection area of the indoor radar in accordance with one embodiment.
Figure 5:
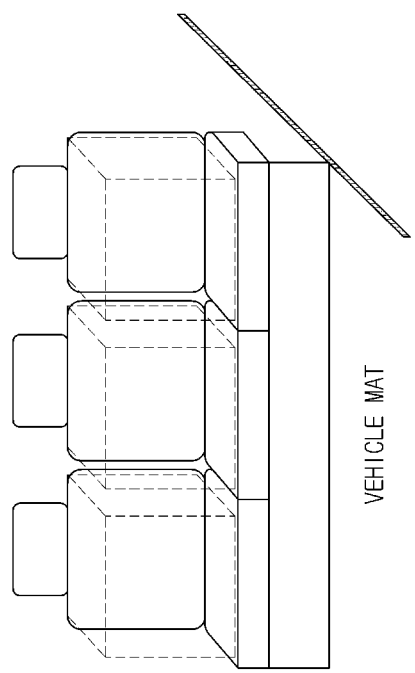
Figure 6:
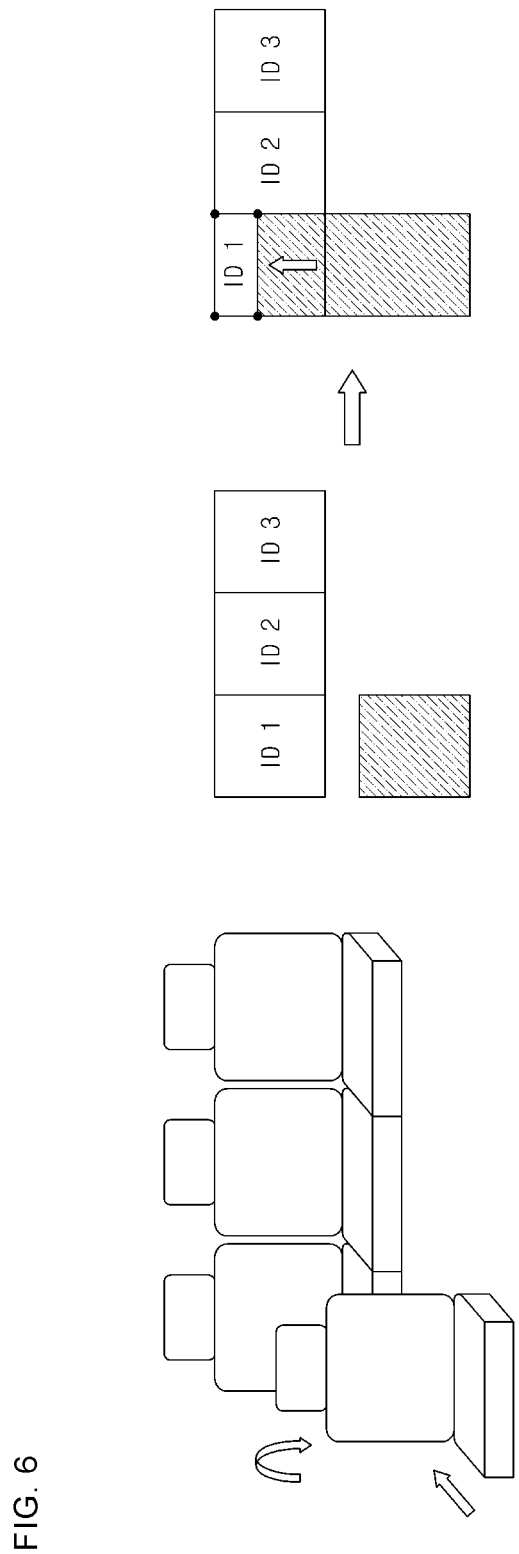
FIGS. 6-8 illustrate a detection area of the rear seat that becomes different according to a change of a seat.
Figure 7:
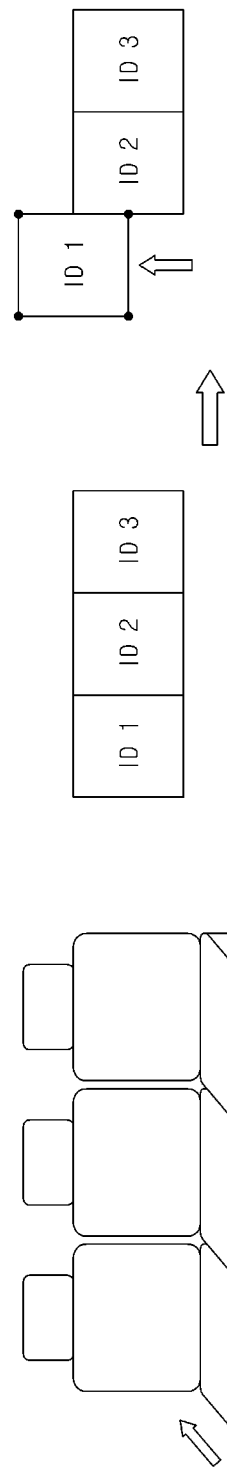
Figure 8:
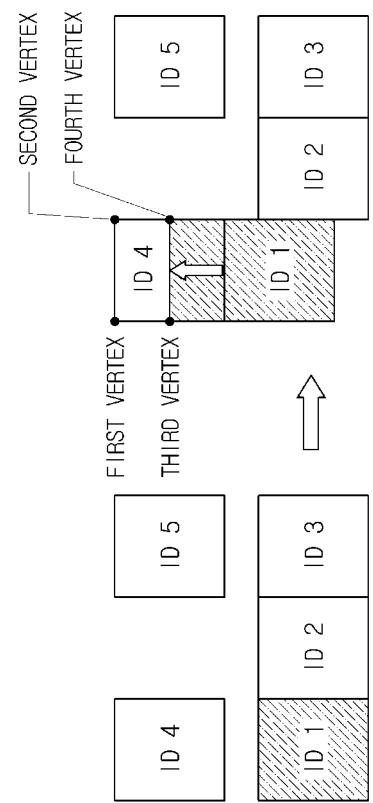
Figure 8:
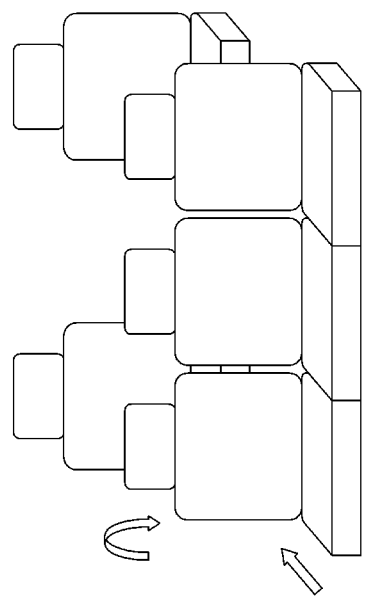

FIG. 3 illustrates a method of detecting a rear seat in accordance with one embodiment. FIG. 4 illustrates a detection area of an indoor camera in accordance with one embodiment. FIG. 5 illustrates a detection area of an indoor radar in accordance with one embodiment. FIGS. 6 to 8 illustrate a detection area of the rear seat that becomes different according to a change of a seat. FIGS. 9 to 12 illustrate radar data in a changed detection area of the rear seat.

Referring to FIG. 3, when a vehicle's ignition is on and a transmission is in a drive mode (800), the first controller 200 obtains information on a change in a front passenger seat and a rear seat (810) and identifies a change in a detection area of the rear seat based on the obtained information on the change (820). The second controller 300 detects a motion of a rear seat object (830) and determines whether a human is seated in the rear seat of the vehicle based on information on the motion of the object in the detection area where the change is identified (840). The first controller 200 transmits information regarding whether the rear seat is occupied, as determined by the second controller 300, to a controller configured to determine whether a seat belt is worn (850).

As illustrated in FIG. 4, the indoor camera 100 may be installed in a room mirror or installed inside a front windshield and have a field of view directed to the interior of the vehicle. The field of view of the indoor camera 100 may be set to an entire vehicle interior including first-row and second-row seats.

As illustrated in FIG. 4, the indoor radar 110 may be installed in a headliner of a second row of the vehicle and may have a sensing area directed to the interior of the vehicle. As illustrated in FIG. 5, the sensing area of the indoor radar 110 may be set for each rear seat. FIG. 5 illustrates a detection area of a five-seater vehicle and a detection area of a seven-seater vehicle.

When a vehicle's ignition is on and a transmission is in a drive mode, the first controller 200 may obtain information on a change in a front passenger seat and a rear seat of the vehicle by processing the image data obtained from the indoor camera 100. In addition, the first controller 200 may identify a change in a detection area of the rear seat based on information on the change in the front passenger seat and the rear seat of the vehicle.

For example, as illustrated in FIG. 6, when a front passenger seat of a five-seater vehicle moves backward and a back is tilted backward, the first controller 200 may obtain information on such a change in the seat. Based on the information on the change, the first controller 200 may identify that a rear seat detection area (ID1) behind the front passenger seat is reduced and may transmit coordinate information of each vertex of the reduced detection area (ID1) to the second controller 300.

Alternatively, as illustrated in FIG. 7, when a part of rear seats of a five-seater vehicle is moved backward, the first controller 200 may obtain information on such a change in the seats. Based on the information on the change, the first controller 200 may identify that an entire detection area (ID1) of a rear seat that has moved backward among the rear seats has moved backward, and may transmit coordinate information of each vertex of the area (ID1) to the second controller 300.

Alternatively, as illustrated in FIG. 8, when a part of rear seats in a second row of a seven-seater vehicle is moved backward and a back is tilted backward, the first controller 200 may obtain information on such a change in the seats. Based on the information on the change, the first controller 200 may identify that a rear seat detection area (ID4) in a third row is reduced and may transmit coordinate information of each vertex of the reduced area (ID4) to the second controller 300.

The first controller 200 may transmit information on a changed detection area to the second controller 300 by using the following data format.

| [Data format] | | | | | | | | | |
|---|---|---|---|---|---|---|---|---|---|
| Number of changed areas | ID of changed area | x-axis coordinate of first vertex | y-axis coordinate of first vertex | x-axis coordinate of second vertex | y-axis coordinate of second vertex | x-axis coordinate of third vertex | y-axis coordinate of third vertex | x-axis coordinate of fourth vertex | y-axis coordinate of fourth vertex |

When a vehicle's ignition is on and a transmission is in a drive mode, the second controller 300 may obtain motion information on an object in a rear seat of the vehicle by processing the radar data obtained from the indoor radar 110.

The second controller 300 may be a 60 GHZ FMCW modulation type radar controller. The second controller 300 may perform digital signal processing (FFT+MVDR+CFAR) on a digital sample delivered from ADC of the indoor radar 110.

The fast Fourier transform (FFT) may be used to analyze a signal in a frequency domain.

A minimum variance distortionless response (MVDR) is an algorithm that increases an SNR while minimizing output power of an array by maintaining a certain gain for a signal incident in a predetermined direction and giving a small weight (nulling) to a signal in another direction.

A constant false alarm rate (CFAR) algorithm is a method of setting a threshold value according to an ambient noise signal. Generally, in most signals received by the indoor radar 110, a noise signal occupies a larger area than a target signal in time-space domain. Accordingly, a target detection typically sets a threshold value and determines a signal above the threshold value as a target. However, in a real situation, since the signal intensity of noise changes over time, setting a constant threshold value increases the probability of mistakenly targeting a signal that is not a target. Accordingly, a CFAR algorithm, which sets a threshold value according to an ambient noise signal, may be used.

Through the above-described digital signal processing, the second controller 300 may obtain motion information including information on a distance, a velocity, and an angle of arrival of the object in the rear seat.

The second controller 300 may determine whether the motion of the object is a motion of a human, by using the motion information on the object in the rear seat. For example, the second controller 300 may determine whether the motion of the object is a motion of a human such as breathing and heart beats, by using the information on the distance, the velocity, and the angle of arrival, which is included in the motion information on the object, and a point cloud.

An area detected by the indoor radar 110 may be differently set according to a specification of a vehicle (the number of rear seats, an overall height, an overall width, or the like). The detection area has a cuboid form, and coordinate information of each vertex of the cuboid is a parameter that may be set in a radar controller production operation. A coordinate value of each vertex is set based on a vehicle center point, a base of the cuboid may be set to a seating face, and a height may be set to a seat back height.

The second controller 300 may determine whether a human is seated in the rear seat of the vehicle based on information on the motion of the object in the detection area where the change is identified, transmitted from the first controller 200. That is, the second controller 300 may identify a changed detection area based on coordinate information of the changed detection area, which is transmitted from the first controller 200, and may determine that a human is seated in the rear seat when a point cloud is formed in the identified detection area.

Figure 9:
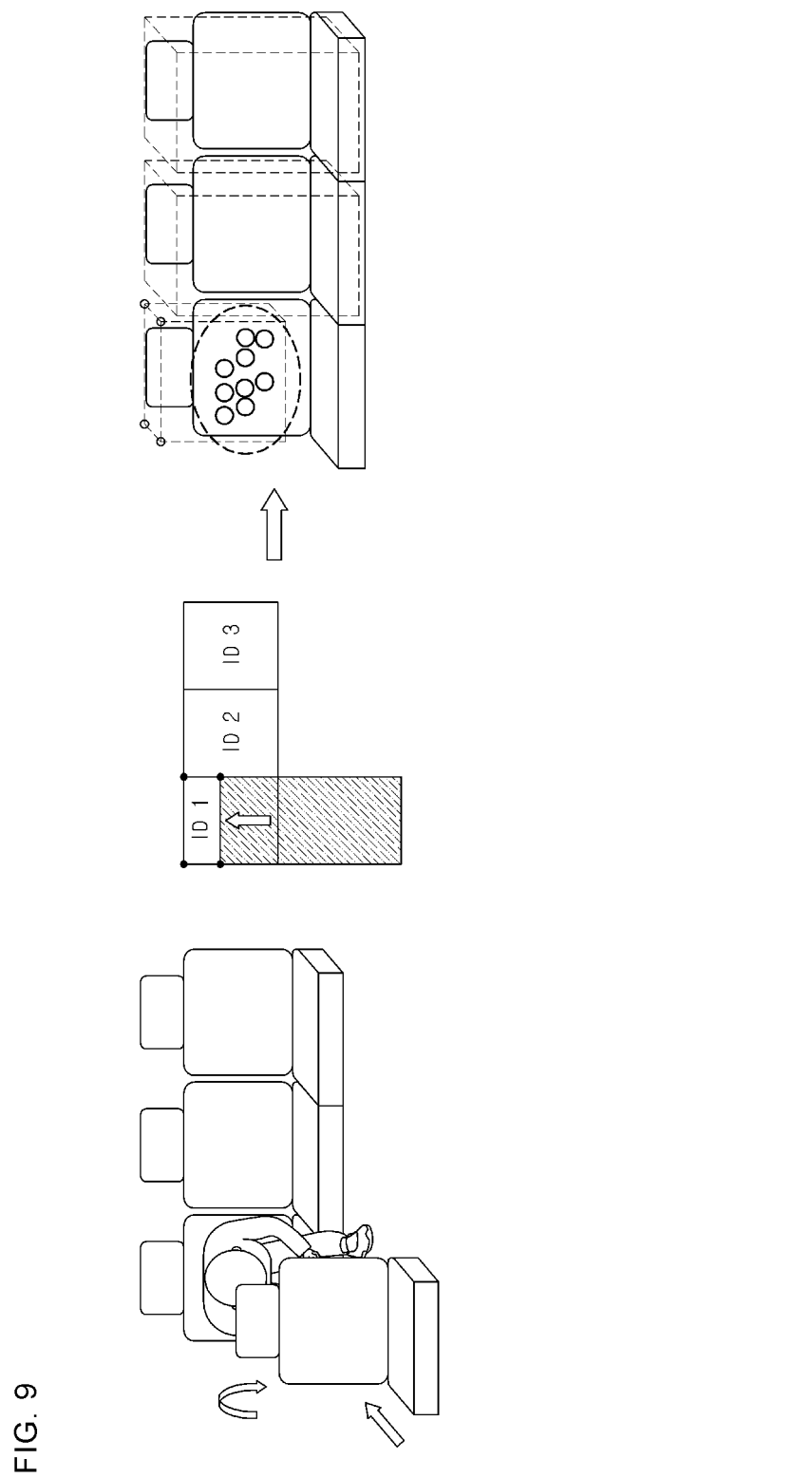
FIGS. 9-12 illustrate radar data in a changed detection area of the rear seat.

For example, as illustrated in FIG. 9, when a front passenger seat of a five-seater vehicle is moved backward and a back is tilted backward, the second controller 300 may determine as "detected" if a point cloud is formed in the reduced detection area (ID1) that is transmitted from the first controller 200. That is, the first controller 200 may determine that a human is seated in the rear seat corresponding to the reduced detection area (ID1).

Figure 10:
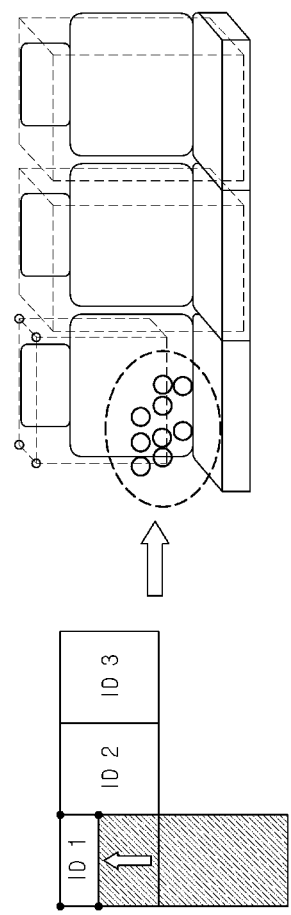
Figure 10:
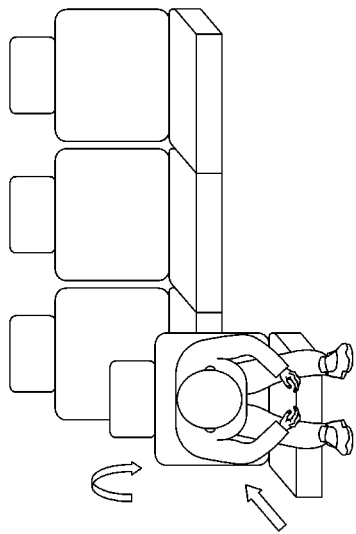

Alternatively, as illustrated in FIG. 10, when a front passenger seat of a five-seater vehicle is moved backward, a back is tilted backward and a human is seated in the front passenger seat, even though a point cloud is formed in a second row due to the moved front passenger seat and the tilted back, since no point cloud is formed in the reduced detection area (ID1) transmitted from the first controller 200, the second controller 300 may determine as "not detected". That is, the second controller 300 may determine that no human is seated in the rear seat corresponding to the reduced detection area (ID1).

Figure 11:
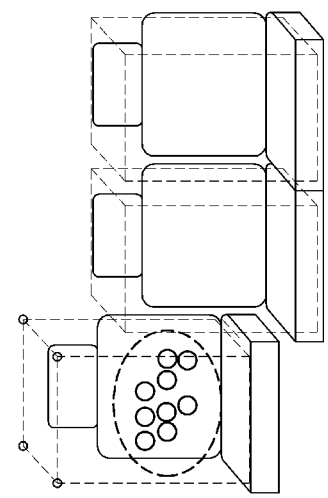
Figure 11:
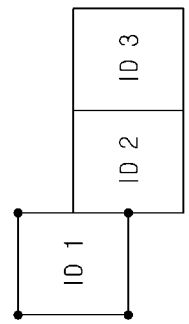
Figure 11:
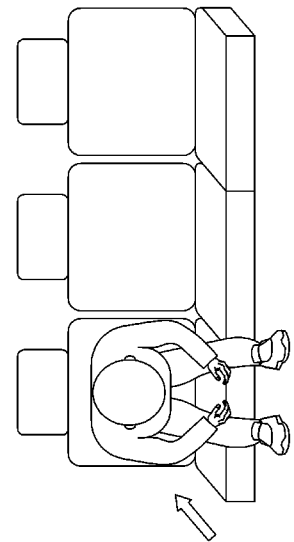

Alternatively, as illustrated in FIG. 11, when a rear seat of a five-seater vehicle is moved backward, the second controller 300 may determine as "detected" if a point cloud is formed in the backward-moved detection area (ID1) transmitted from the first controller 200. That is, the second controller 300 may determine that a human is seated in the rear seat corresponding to 10) the backward-moved detection area (ID1).

Figure 12:
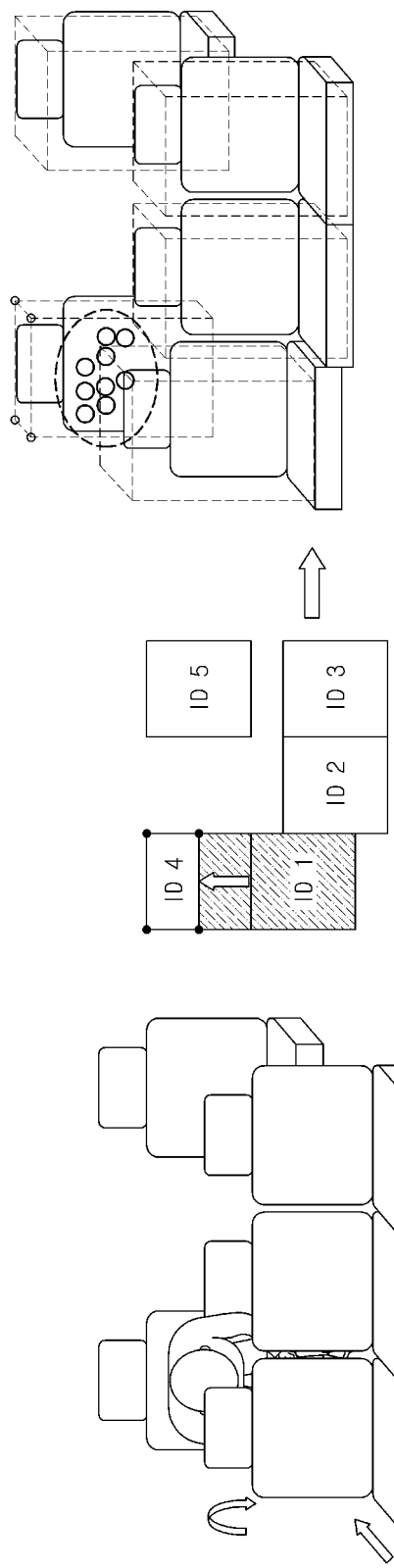

Alternatively, as illustrated in FIG. 12, when a part of rear seats of a second row in a seven-seater vehicle is moved backward and a back is tilted backward, the second controller 300 may determine as "detected" if a point cloud is formed in the reduced detection area (ID4) that is transmitted from the first controller 200. That is, the first controller 200 may determine that a human is seated in the rear seat corresponding to the reduced detection area (ID4).

The first controller 200 may transmit information regarding whether the rear seat is occupied, as determined by the second controller 300, to a controller configured to determine whether a seat belt is worn. The controller configured to determine whether a seat belt is worn may determine whether a human seated in the rear seat has worn the seat belt based on the information on whether the rear seat is seated from the first controller 200, and when it is determined that the seat belt is not worn, the controller may notify the driver that the seat belt is not worn using various means.

As is apparent from the above description, the rear seat detection device 50 according to the disclosed embodiment may be recognized as a reliable safety function that consumers can trust by significantly lowering a missed detection rate or false detection rate regarding whether a rear seat is occupied and may consequently reduce safety accidents caused by not wearing the seat belt. In addition, the cost of using a high-performance single controller may be lowered by distributed operation between the first controller 200, which is an indoor camera controller, and the second controller 300, which is an indoor radar controller.

In accordance with one aspect of the present disclosure, it is possible to provide an apparatus for notifying whether a rear seat occupant is seated more accurately through an indoor camera and an indoor radar, and a controlling method thereof.

Thus, the apparatus can be recognized as a reliable safety function that consumers can trust by significantly lowering a missed detection rate or false detection rate regarding whether a rear seat is occupied, and consequently, safety accidents caused by not wearing the seat belt can be reduced.

In addition, a distributed operation between a camera controller and a radar controller can mitigate a cost increase that may occur when using a high-performance single controller.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. An object detection apparatus comprising:
   an indoor camera having a field of view for a vehicle interior and configured to provide image data;
   an indoor radar having a sensing area for the vehicle interior and configured to provide radar data;
   a controller including a first processor and a second processor, the first processor configured to process the image data to obtain information on a change in a front passenger seat and a rear seat of a vehicle, and the second processor configured to process the radar data to obtain motion information on an object in the rear seat of the vehicle,
   wherein the controller is configured to:
   identify a change of a detection area in the rear seat based on the information on the change in the front passenger seat and the rear seat of the vehicle, and
   determine whether a human is seated in the rear seat of the vehicle based on the motion information on the object in the detection area where the change is identified.

2. The object detection apparatus of claim 1, wherein the controller is configured to obtain motion information including a distance, a velocity, and an angle of arrival of the object by performing digital signal processing on the radar data.

3. The object detection apparatus of claim 1, wherein the controller is configured to obtain a respiratory rate, a heart rate, and point cloud information of the object based on the motion information.

4. The object detection apparatus of claim 3, wherein the controller is configured to determine whether the object is moving based on the obtained information.

5. The object detection apparatus of claim 3, wherein the point cloud information includes x, y, and z coordinate information of points constituting the object.

6. The object detection apparatus of claim 1, wherein the controller is configured to obtain coordinate information of each vertex of a changed detection area based on identifying the change of the detection area in the rear seat.

7. The object detection apparatus of claim 6, wherein the controller is configured to identify the changed detection area based on the obtained coordinate information.

8. The object detection apparatus of claim 7, wherein the controller is configured to obtain a respiratory rate, a heart rate, and point cloud information of the object based on the motion information in the detection area where the change is identified.

9. The object detection apparatus of claim 8, wherein the controller is configured to determine that the human is seated in the rear seat of the vehicle based on a point cloud being formed in the detection area where the change is identified.

10. The object detection apparatus of claim 1, wherein the controller transmits information indicating that the human is seated in the rear seat of the vehicle to a vehicle controller configured to detect whether a seat belt is worn.

11. A method comprising:
    obtaining, by an indoor camera, image data;
    obtaining, by an indoor radar, radar data;
    obtaining, by at least one processor, information on a change in a front passenger seat and a rear seat of a vehicle based on processing the image data;
    obtaining, by the at least one processor, motion information on an object in the rear seat of the vehicle based on processing the radar data;
    identifying, by the at least one processor, a change of a detection area in the rear seat based on the information on the change in the front passenger seat and the rear seat of the vehicle; and
    determining, by the at least one processor, whether a human is seated in the rear seat of the vehicle based on the motion information on the object in the detection area where the change is identified.

12. The method of claim 11, wherein the obtaining of the motion information comprises obtaining motion information including a distance, a velocity, and an angle of arrival of the object by performing digital signal processing on the radar data.

13. The method of claim 11, wherein the obtaining of the motion information comprises obtaining a respiratory rate, a heart rate, and point cloud information of the object based on the motion information.

14. The method of claim 13, wherein the obtaining of the motion information comprises determining whether the object is moving based on the obtained information.

15. The method of claim 13, wherein the point cloud information includes x, y, and z coordinate information of points constituting the object.

16. The method of claim 11, further comprising obtaining coordinate information of each vertex of a changed detection area based on identifying the change of the detection area in the rear seat.

17. The method of claim 16, wherein the determining of whether the human is seated in the rear seat of the vehicle comprises identifying the changed detection area based on the obtained coordinate information.

18. The method of claim 17, wherein the determining of whether the human is seated in the rear seat of the vehicle comprises obtaining a respiratory rate, a heart rate, and point cloud information of the object based on the motion information in the detection area where the change is identified.

19. The method of claim 18, wherein the determining of whether the human is seated in the rear seat of the vehicle comprises determining that the human is seated in the rear seat of the vehicle based on a point cloud being formed in the detection area where the change is identified.

20. The method of claim 11, further comprising transmitting information indicating that the human is seated in the rear seat of the vehicle to a vehicle controller configured to detect whether a seat belt is worn.

* * * * *